(12) United States Patent
Jiao

(10) Patent No.: US 12,399,378 B1
(45) Date of Patent: Aug. 26, 2025

(54) STABILIZED GIMBAL OF ERECTING PRISM, STABILIZED MONOCULAR, AND STABILIZED BINOCULARS

(71) Applicant: Chengdu Dinxin Precision Control Tech Co., Ltd., Chengdu (CN)

(72) Inventor: Zhitao Jiao, Chengdu (CN)

(73) Assignee: CHENGDU DINXIN PRECISION CONTROL TECH CO., LTD., Chengdu (CN)

( * ) Notice: Subject to any disclaimer, the term of this patent is extended or adjusted under 35 U.S.C. 154(b) by 0 days.

(21) Appl. No.: 18/897,874

(22) Filed: Sep. 26, 2024

(51) Int. Cl.
*G02B 27/64* (2006.01)
*G02B 7/18* (2021.01)
*G02B 23/02* (2006.01)

(52) U.S. Cl.
CPC ......... *G02B 27/646* (2013.01); *G02B 7/1805* (2013.01); *G02B 23/02* (2013.01)

(58) Field of Classification Search
CPC .... G02B 27/00; G02B 27/0025; G02B 27/02; G02B 27/022; G02B 27/64; G02B 27/642; G02B 27/644; G02B 27/646; G02B 27/648; G02B 23/00; G02B 23/02; G02B 23/08; G02B 23/14; G02B 23/16; G02B 23/18; G02B 23/24; G02B 23/2476; G02B 23/2484; G02B 7/00; G02B 7/003; G02B 7/008; G02B 7/18; G02B 7/1805; G02B 7/181

USPC ................................... 359/554–557
See application file for complete search history.

(56) References Cited

U.S. PATENT DOCUMENTS

| | | | |
|---|---|---|---|
| 5,122,908 A * | 6/1992 | Sporer | G02B 23/16 |
| | | | 359/557 |
| 9,395,551 B2 | 7/2016 | Ando et al. | |
| 9,417,458 B2 * | 8/2016 | Ando | G02B 27/646 |

FOREIGN PATENT DOCUMENTS

| | | |
|---|---|---|
| CN | 115903168 A | 4/2023 |
| CN | 220305562 U | 1/2024 |
| JP | 2014-167603 A * | 9/2014 |

* cited by examiner

*Primary Examiner* — Thong Q Nguyen
(74) *Attorney, Agent, or Firm* — Gallium Law; Jacob Panangat; Nam Nguyen

(57) ABSTRACT

This application relates to the field of telescopes, and provides a stabilized gimbal of an erecting prism, a stabilized monocular, and stabilized binoculars. The stabilized gimbal of an erecting prism includes a prism casing, a rotation frame, an external mounting bracket, and a drive control assembly, where the drive control assembly is configured to: drive the prism casing to rotate around a first rotation shaft, and drive the rotation frame to rotate around a second rotation shaft based on deflection position information of the prism casing, deflection position information of the rotation frame, and three-dimensional rotation angular velocity information of the erecting prism.

17 Claims, 7 Drawing Sheets

STABILIZED GIMBAL OF ERECTING PRISM, STABILIZED MONOCULAR, AND STABILIZED BINOCULARS

TECHNICAL FIELD

The present disclosure relates to the field of telescopes, and, in particular, to a stabilized gimbal of an erecting prism, a stabilized monocular, and stabilized binoculars.

BACKGROUND

Both an objective lens and an ocular lens of the Kepler telescope are convex lenses for forming an inverted image. Therefore, an erecting prism is disposed between the objective lens and the ocular lens for changing the inverted image into an erect image. Generally, a roof prism or a Porro prism is used as the erecting prism.

The deflection of the outgoing angle of light is twice that of the incident angle, and therefore, image stabilization of the telescope can be achieved. The erecting prism is placed on a middle position between the objective lens and a focal point, and the erecting prism is kept to be inertially static via a gyroscope sensor. When the telescope has a jitter, the erecting prism has deflection relative to the objective lens and the ocular lens of the telescope, to eliminate image shake caused by the jitter of the telescope.

An image stabilization control method disclosed in patent U.S. Pat. No. 9,395,551B2 is simple in principle, and only requires output of a gyroscope to be zero as a target control value, in other words, an erecting prism is kept to be inertially static. However, there is a limitation that the erecting prism must be placed on a middle position between an objective lens and a focal point of the erecting prism, which may cause deterioration of optical performance. However, generally, in order to improve optical imaging quality of the telescope, the erecting prism is close to the focal point. In this case, the original image stabilization control method cannot be used, and an insufficient light deflection angle leads to severe deterioration of image stabilization effect.

SUMMARY

An objective of the present disclosure provides a stabilized gimbal of an erecting prism, a stabilized monocular, and stabilized binoculars, which can ensure optical imaging quality while achieving shake proofing.

To achieve the above objective, the present disclosure provides the following technical solutions.

According to a first aspect, the present disclosure provides a stabilized gimbal of an erecting prism, where the stabilized gimbal of an erecting prism includes: a prism casing, a rotation frame, an external mounting bracket, and a drive control assembly; the erecting prism is mounted in the prism casing; the prism casing is rotatably mounted in the rotation frame; and a rotation shaft, relative to the rotation frame, of the prism casing is a first rotation shaft; the rotation frame is rotatably mounted in the external mounting bracket; a rotation shaft, relative to the external mounting bracket, of the rotation frame is a second rotation shaft; the first rotation shaft and the second rotation shaft are perpendicular to each other; and the drive control assembly is separately connected to the prism casing and the rotation frame, and the drive control assembly is configured to: drive the prism casing to rotate around the first rotation shaft, and drive the rotation frame to rotate around the second rotation shaft based on deflection position information of the prism casing, deflection position information of the rotation frame, and three-dimensional rotation angular velocity information of the erecting prism.

Optionally, the drive control assembly includes a first circuit board that is disposed on a first preset position outside the prism casing, drive magnetic steel that is disposed on a second preset position of the rotation frame, and a second circuit board that is disposed on a third preset position inside the external mounting bracket; a first drive coil, a first Hall element, and a gyroscope sensor are disposed on the first circuit board; a second drive coil, a second Hall element, a coil drive chip, and a microprocessor chip are disposed on the second circuit board; the first Hall element and the gyroscope sensor are connected to the microprocessor chip through a flexible connection line; and the coil drive chip is connected to the first drive coil through a flexible connection line; the second Hall element is connected to the microprocessor chip, the microprocessor chip is connected to the coil drive chip, and the coil drive chip is connected to the second drive coil; the first preset position corresponds to the second preset position to enable, through interaction of the first drive coil and the drive magnetic steel, the prism casing to rotate around the first rotation shaft in the rotation frame; the second preset position corresponds to the third preset position to enable, through interaction of the drive magnetic steel and the second drive coil, the rotation frame to rotate around the second rotation shaft in the external mounting bracket; the first Hall element is configured to acquire the deflection position information of the first rotation shaft, the second Hall element is configured to acquire the deflection position information of the second rotation shaft, and the gyroscope sensor is configured to acquire the three-dimensional rotation angular velocity information of the erecting prism; and the microprocessor chip is configured to: generate a drive control quantity based on the deflection position information of the first rotation shaft, the deflection position information of the second rotation shaft, and the three-dimensional rotation angular velocity information of the erecting prism, and output the drive control quantity to the coil drive chip for driving the prism casing and the rotation frame to rotate via the first drive coil and the second drive coil.

Optionally, when generating the drive control quantity based on the deflection position information of the first rotation shaft, the deflection position information of the second rotation shaft, and the three-dimensional rotation angular velocity information of the erecting prism, and outputting the drive control quantity to the coil drive chip for driving the prism casing and the rotation frame to rotate via the first drive coil and the second drive coil, the microprocessor chip is specifically configured to: calculate a target angular velocity value of the first rotation shaft based on the deflection position information of the first rotation shaft; calculate a target angular velocity value of the second rotation shaft based on the deflection position information of the second rotation shaft; respectively obtain, based on the three-dimensional rotation angular velocity information of the erecting prism, an angular velocity feedback quantity of the erecting prism along the first rotation shaft, and an angular velocity feedback quantity of the erecting prism along the second rotation shaft as a first angular velocity feedback quantity and a second angular velocity feedback quantity; obtain, based on the first angular velocity feedback quantity, the drive control quantity by running a feedback control algorithm, and control the prism casing to rotate by controlling the first drive coil to energize for the first angular velocity feedback quantity to be consistent with the target angular velocity value of the first rotation shaft; and obtain, based on the second angular velocity feedback quantity, the drive control quantity by running the feedback control algorithm, and control the rotation frame to rotate by controlling the second drive coil to energize for the second angular velocity feedback quantity to be consistent with the target angular velocity value of the second rotation shaft.

Optionally, a calculation formula of the target angular velocity value is as follows:

Hall_$V$=DIFF(Hall_$M$);

GyroV_$Ext$=Hall_$V$*P_$Ext$;

GyroV_$Aim$=GyroV_$Ext$+GyroV_$Mid$, where

Hall_$M$ is the deflection position information, Hall_$V$ is an offset angular velocity, DIFF( ) is a differential algorithm function, GyroV_Ext is an extra deflection angular velocity, P_Ext is an extra deflection coefficient, GyroV_Aim is the target angular velocity value, and GyroV_Mid is a centering angular acceleration.

Optionally, the prism casing is connected to the rotation frame via a bearing, and the rotation frame is connected to the external mounting bracket via a bearing.

Optionally, the rotation frame is provided with two bearing grooves on two side walls corresponding to two ends of the first rotation shaft, an opening of the bearing groove is provided on at least one edge of the side wall; and during mounting, a bearing mounted on a rotation shaft of the prism casing is inserted into the bearing groove from the edge; and a lug boss is disposed in the bearing groove, the lug boss is configured to clamp the bearing, and a stiffener is disposed at the opening of the bearing groove.

Optionally, the rotation frame is connected to the external mounting bracket via an external threaded screw bearing.

According to a second aspect, the present disclosure provides a stabilized monocular, including an ocular lens, an objective lens, and the stabilized gimbal of an erecting prism, where the stabilized gimbal of an erecting prism is disposed in a casing between the ocular lens and the objective lens.

Optionally, the casing is used as an external mounting bracket of the stabilized gimbal of an erecting prism.

According to a third aspect, the present disclosure provides stabilized binoculars, where the stabilized binoculars include a first ocular lens, a second ocular lens, a first objective lens, a second objective lens, and the stabilized gimbal of an erecting prism; a first erecting prism and a second erecting prism are disposed in a prism casing of the stabilized gimbal of an erecting prism; the first ocular lens, the first erecting prism, and the first objective lens are correspondingly disposed; and the second ocular lens, the second erecting prism, and the second objective lens are correspondingly disposed.

According to specific examples provided in the present disclosure, the present disclosure discloses the following technical effects:

The present disclosure provides a stabilized gimbal of an erecting prism, a stabilized monocular, and stabilized binoculars. The stabilized gimbal of an erecting prism includes a prism casing, a rotation frame, an external mounting bracket, and a drive control assembly, where the erecting prism is mounted in the prism casing; the prism casing is rotatably mounted in the rotation frame; and a rotation shaft, relative to the rotation frame, of the prism casing is a first rotation shaft; the rotation frame is rotatably mounted in the external mounting bracket; a rotation shaft, relative to the external mounting bracket, of the rotation frame is a second rotation shaft; the first rotation shaft and the second rotation shaft are perpendicular to each other; and the drive control assembly is configured to: drive the prism casing to rotate around the first rotation shaft, and drive the rotation frame to rotate around the second rotation shaft based on deflection position information of the prism casing, deflection position information of the rotation frame, and three-dimensional rotation angular velocity information of the erecting prism. According to the present disclosure, the prism casing and the rotation frame are controlled to rotate based on the deflection position information of the prism casing, the deflection position information of the rotation frame, and the three-dimensional rotation angular velocity information of the erecting prism. On the basis of control performed based on the three-dimensional rotation angular velocity information, control is performed by combining a deflection position of the prism casing with a deflection position of the rotation frame, so that optical imaging quality can be ensured while shake proofing is achieved.

BRIEF DESCRIPTION OF THE DRAWINGS

To describe the technical solutions in the examples of the present disclosure or in the prior art more clearly, the following briefly describes the accompanying drawings required for the examples. Apparently, the accompanying drawings in the following description show merely some examples of the present disclosure, and a person of ordinary skill in the art may still derive other accompanying drawings from these accompanying drawings without creative efforts.

COMPONENT INDEX

1—Prism casing
101—Inner bearing
102—Drive circuit mounting surface
2—Rotation frame
201—Outer bearing base
202—Lug boss
203—Stiffener
204—Bearing groove
3—External mounting bracket
4—Erecting prism
5—First rotation shaft
6—Second rotation shaft
7—First circuit board
8—Drive magnetic steel 9—Second circuit board
10—Objective lens
11—Stabilized gimbal of the erecting prism
12—Outer casing
13—Ocular lens
14—Focusing lens
15—Rhombic prism
16—Screw bearing
17—Flexible connection line
18—Control circuit board
19—Upper cover.

DETAILED DESCRIPTION

The technical solutions in the embodiments of the present disclosure are clearly and completely described below with reference to the drawings in the embodiments of the present disclosure. Apparently, the described embodiments are only some rather than all of the embodiments of the present disclosure. All other embodiments obtained by a person of ordinary skill in the art based on the embodiments of the utility model without creative efforts shall fall within the protection scope of the utility model.

To make the above objectives, features, and advantages of the present disclosure more obvious and easier to understand, the present disclosure will be further described in detail with reference to the accompanying drawings and specific implementations.

Figure 1:
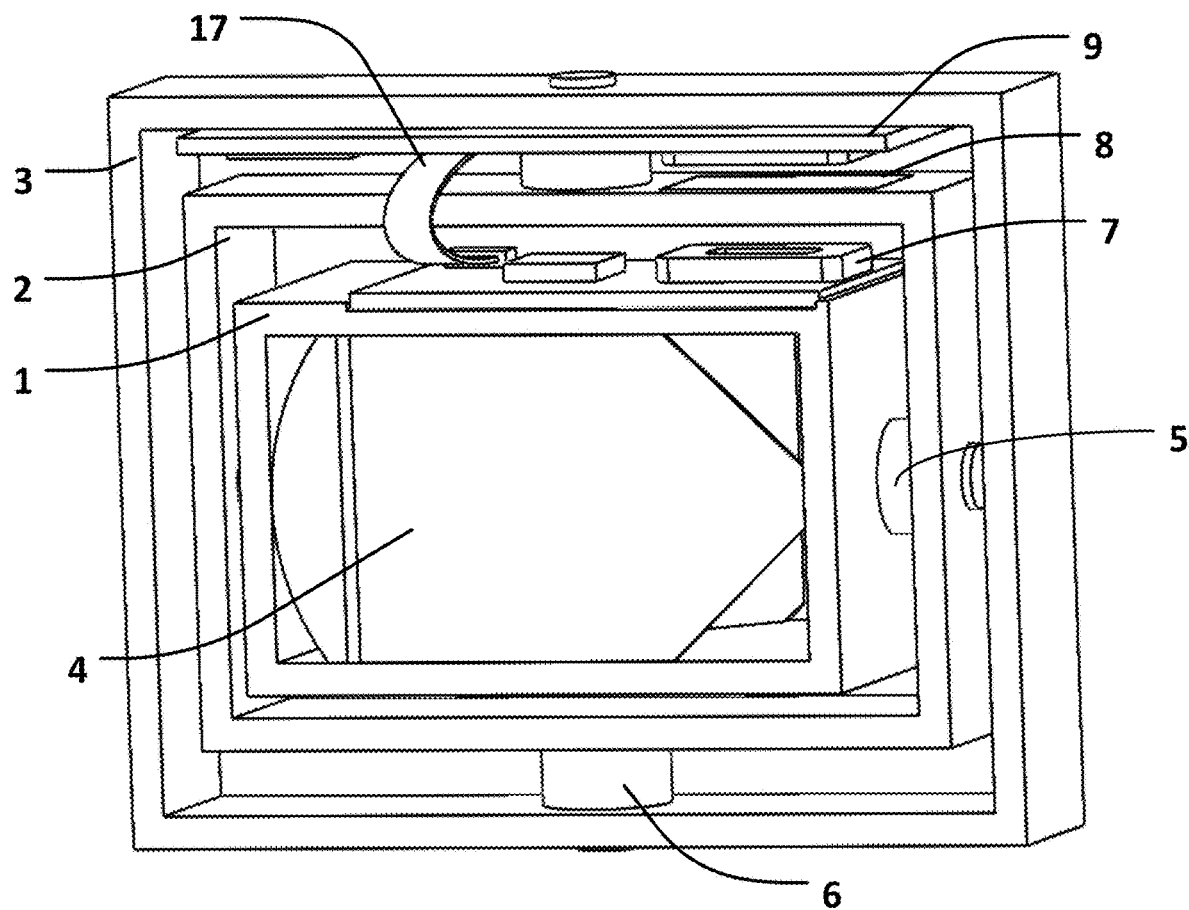
FIG. 1 is a schematic diagram of a structure of a stabilized gimbal of an erecting prism according to an embodiment of the present disclosure.

In an example embodiment, as shown in FIG. 1, a stabilized gimbal of an erecting prism is provided. The stabilized gimbal of an erecting prism includes a prism casing 1, a rotation frame 2, an external mounting bracket 3, and a drive control assembly; the erecting prism 4 is mounted in the prism casing 1; the prism casing 1 is rotatably mounted in the rotation frame 2; a rotation shaft, relative to the rotation frame 2, of the prism casing 1 is a first rotation shaft 5; the rotation frame 2 is rotatably mounted in the external mounting bracket 3; a rotation shaft, relative to the external mounting bracket 3, of the rotation frame 2 is a second rotation shaft 6; the first rotation shaft 5 and the second rotation shaft 6 are perpendicular to each other; and the drive control assembly is separately connected to the prism casing 1 and the rotation frame 2, and the drive control assembly is configured to: drive the prism casing 1 to rotate around the first rotation shaft 5, and drive the rotation frame 2 to rotate around the second rotation shaft 6 based on deflection position information of the prism casing 1, deflection position information of the rotation frame 2, and three-dimensional rotation angular velocity information of the erecting prism 4.

The drive control assembly includes a first circuit board 7 that is disposed on a first preset position outside the prism casing 1, drive magnetic steel 8 that is disposed on a second preset position of the rotation frame 2, and a second circuit board 9 that is disposed on a third preset position inside the external mounting bracket 3; a first drive coil, a first Hall element, and a gyroscope sensor are disposed on the first circuit board 7; a second drive coil, a second Hall element, a coil drive chip, and a microprocessor chip are disposed on the second circuit board 9; the first Hall element and the gyroscope sensor are connected to the microprocessor chip through a flexible connection line 17; the coil drive chip is connected to the first drive coil through the flexible connection line 17; the second Hall element is connected to the microprocessor chip, the microprocessor chip is connected to the coil drive chip, and the coil drive chip is connected to the second drive coil; the first preset position corresponds to the second preset position to enable, through interaction of the first drive coil and the drive magnetic steel 8, the prism casing 1 to rotate around the first rotation shaft 5 in the rotation frame 2; the second preset position corresponds to the third preset position to enable, through interaction of the drive magnetic steel 8 and the second drive coil, the rotation frame 2 to rotate around the second rotation shaft 6 in the external mounting bracket 3; the first Hall element is configured to acquire the deflection position information of the first rotation shaft 5, the second Hall element is configured to acquire the deflection position information of the second rotation shaft 6, and the gyroscope sensor is configured to acquire the three-dimensional rotation angular velocity information of the erecting prism 4; and the microprocessor chip is configured to: generate a drive control quantity based on the deflection position information of the first rotation shaft 5, the deflection position information of the second rotation shaft 6, and the three-dimensional rotation angular velocity information of the erecting prism 4, and output the drive control quantity to the coil drive chip for driving the prism casing 1 and the rotation frame 2 to rotate via the first drive coil and the second drive coil.

When generating the drive control quantity based on the deflection position information of the first rotation shaft 5, the deflection position information of the second rotation shaft 6, and the three-dimensional rotation angular velocity information of the erecting prism 4, and outputting the drive control quantity to the coil drive chip for driving the prism casing 1 and the rotation frame 2 to rotate via the first drive coil and the second drive coil, the microprocessor chip is specifically configured to: calculate a target angular velocity value of the first rotation shaft 5 based on the deflection position information of the first rotation shaft 5; calculate a target angular velocity value of the second rotation shaft 6 based on the deflection position information of the second rotation shaft 6; respectively obtain, based on the three-dimensional rotation angular velocity information of the erecting prism 4, an angular velocity feedback quantity of the erecting prism 4 along the first rotation shaft 5, and an angular velocity feedback quantity of the erecting prism 4 along the second rotation shaft 6 as a first angular velocity feedback quantity and a second angular velocity feedback quantity; obtain, based on the first angular velocity feedback quantity, the drive control quantity by running a feedback control algorithm, and control the prism casing 1 to rotate by controlling the first drive coil to energize for the first angular velocity feedback quantity to be consistent with the target angular velocity value of the first rotation shaft 5; and obtain, based on the second angular velocity feedback quantity, the drive control quantity by running the feedback control algorithm, and control the rotation frame 2 to rotate by controlling the second drive coil to energize for the second angular velocity feedback quantity to be consistent with the target angular velocity value of the second rotation shaft 6.

Figure 2:
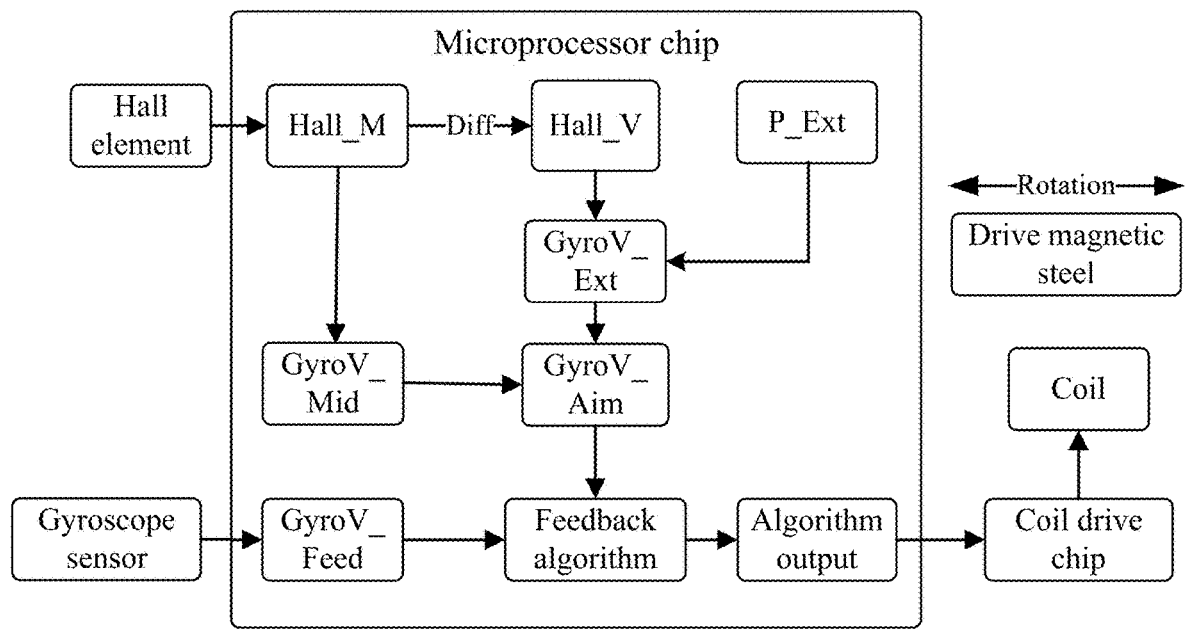
FIG. 2 is a control principle diagram of a stabilized gimbal of an erecting prism according to an embodiment of the present disclosure.

As shown in FIG. 2, a control method for controlling the prism casing 1 and the rotation frame 2 to rotate based on the deflection position information of the first rotation shaft 5, the deflection position information of the second rotation shaft 6, and the three-dimensional rotation angular velocity information of the erecting prism 4 is as follows.

The gimbal has two rotation directions along shafts: an up-down rotation direction (along the first rotation shaft 5), and a left-right rotation direction (along the second rotation shaft 6). The following only describes a rotation direction along a single shaft: The coil drive chip is configured to: obtain deflection position information Hall_M of the shaft by collecting voltage data when the drive magnetic steel 8 deviates from the Hall element, obtain an offset angular velocity Hall_V by using a differential algorithm of built-in software of the coil drive coil, obtain an extra offset angular velocity GyroV_Ext through calculation based on an extra offset coefficient P_Ext, obtain a centering angular acceleration GyroV_Mid by combining a position deviating from a midpoint, and obtain a target angular velocity value GyroV_Aim through calculation.

Hall_$V$=DIFF(Hall_$M$);

GyroV_$Ext$=Hall_$V$*P_Ext;

GyroV_$Aim$=GyroV_$Ext$+GyroV_$Mid$, where

DIFF( ) is a differential algorithm function.

The coil drive chip is configured to collect data of a gyroscope sensor, to obtain an angular velocity of motion along each shaft, namely, the three-dimensional rotation angular velocity information, of the erecting prism 4 as a feedback quality of feedback control. A feedback control algorithm is run to output a drive quantity based on the feedback quantity and the target angular velocity value. The drive quantity is output to the drive coil of the corresponding shaft via the coil drive chip.

In the control method of the present disclosure: The gyroscope sensor is mounted on a load side of the stabilized gimbal 11 of an erecting prism; angular velocity data of the gyroscope sensor is used as a feedback quantity GyroV_Feed of a closed-loop control; deflection position information Hall_M of the gimbal is detected via the Hall sensor, and differential computing is performed on the deflection position information Hall_M to obtain a deflection angular velocity Hall_V; the deflection angular velocity is multiplied by a deflection coefficient to obtain an extra deflection angular velocity control quantity as a target control value (GyroV_Ext=Hall_V×P_Ext) for image stabilization; a speed control component GyroV_Mid for centering the gimbal is obtained with reference to a use habit; and a final target control quantity (GyroV_Aim=GyroV_Ext+GyroV_Mid) is calculated. The first drive coil and the second drive coil are controlled by running the feedback control algorithm, so that GyroV_Feed precisely follows the target control quantity GyroV_Aim, to achieve image stabilization effect.

GyroV_Mid is a control component for automatic centering of the gimbal. When a telescope is used to search for a target, a deflection angle of the telescope is far greater than a jitter angle during gazed observation, and a deflection angle of the stabilized gimbal 11 of an erecting prism also exceeds a rotation range. In this case, a centering speed component GyroV_Mid, namely, GyroV_Mid=Fun (Hall_M), is calculated based on the deflection angle.

Compared with the existing United States patent U.S. Pat. No. 9,395,551B2, the technical solution provided in the present disclosure has the following advantages.

In the United States patent U.S. Pat. No. 9,395,551B2, two sets of electromagnetic drive apparatuses (voice coil motors) are used for dual-shaft driving, a group of magnetic steel is separately placed on a prism casing 1 and an external mounting bracket 3, and an extra iron sheet needs to be used as a magnet yoke. This leads to a large weight of a rotation load, much center-of-gravity offset, a large quantity of parts, a large overall weight, tedious balancing, and high costs. In the present disclosure, two sets of electromagnetic drive apparatus share one group of drive magnetic steel, and the drive magnetic steel is placed on a rotation middle frame, so that parts of a rotation load are significantly reduced, weight is significantly reduced, center-of-gravity offset is small, balancing can be simplified, assembly and debugging are simplified, and costs are reduced.

In the control method in the United States patent U.S. Pat. No. 9,395,551B2, the erecting prism 4 is kept at an initial state, in other words, the prism is kept to be inertially stable through feedback of the gyroscope sensor for an angular velocity of a gyroscope to be zero as a target control value. The study indicates that erecting prisms 4 of different telescopes are at different positions between objective lens 10 and focal points, and therefore, a jitter in a field of view cannot be completely eliminated by only keeping the erecting prisms 4 to be inertially stable. According to the control method provided in the present disclosure, an offset distance of the magnetic steel relative to a center point of the drive coil can be detected via the Hall element, and a deflection velocity of the magnetic steel can be obtained by running a tracking differential algorithm via the coil drive chip; the deflection velocity is multiplied by the extra deflection coefficient to obtain the extra deflection angular velocity; and the extra deflection angular velocity is used as a target value for angular velocity feedback control. The extra deflection coefficient is determined based on a position at which the prism is disposed between the objective lens 10 and the focal point. When the prism approaches the focal point, the coefficient is increased. In addition, the present disclosure discloses the following control method: collecting data of the Hall element to obtain deflection position data M, running the differential algorithm to obtain a deflection angular velocity V, multiplying the deflection angular velocity V by a compensation coefficient P to obtain a compensation angular velocity that is used as a target value for feedback control of the gyroscope, and under action of the feedback control algorithm and electromagnetic driving, moving the erecting prism 4 in the gimbal along a target track based on the extra compensated angular velocity, to achieve complete compensation of a jitter of the prism. The compensation coefficient is determined based on a sensitivity coefficient of the Hall element, and a position of the erecting prism, and can be adjusted according to actual image stabilization effect.

In an existing assembling process of such products, as there are a large quantity of small-sized parts, operations are tedious and difficult, and optical parts are likely contaminated, an assembling operation of the gimbal, especially, assembling of the prism casing 1 and the rotation frame 2 is tedious. This leads to low production efficiency and a low yield.

Figure 3:
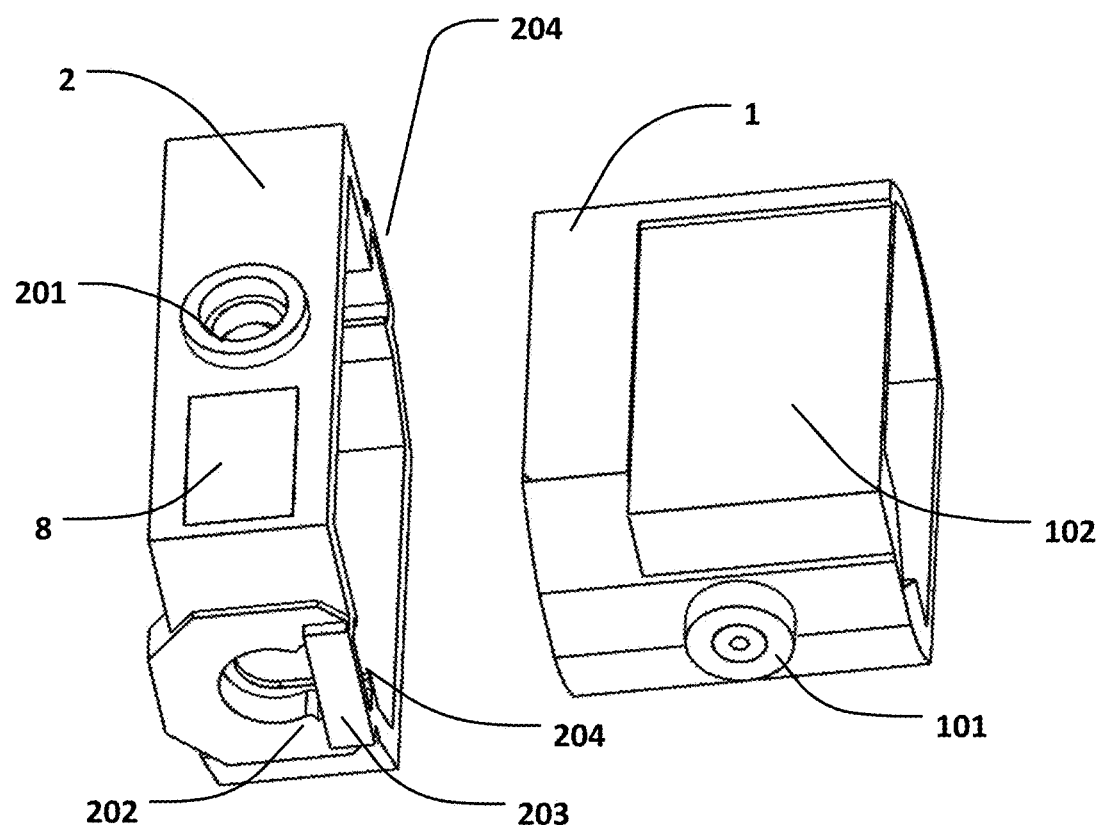
FIG. 3 is a schematic diagram of a structure of a rotation frame according to an embodiment of the present disclosure.

As shown in FIG. 3, specifically, a mounting process for the prism casing 1 and the rotation frame 2 is simplified as a quick assembly manner as follows.

Shafts are designed on two sides of the prism casing 1, and are configured to mount inner bearings 101; a side surface of the prism casing 1 is used as a drive circuit mounting surface 102, and is configured to mount a first drive circuit board 7; a bearing groove 204 with an opening on one side for inserting the inner bearing 101 from a side surface is designed on the rotation frame 2; and a lug boss 201 for clamping the bearing, an outer bearing base 202, and a stiffener 203 for improving mechanical strength of the opening are designed in the bearing groove 204. The lug boss 201 and the outer bearing base 202 can be configured to clamp the bearing, so that the bearing does not slip off; and the stiffener 203 can be configured to press an outer edge of the bearing for positioning.

During assembling, the bearings are first mounted on the shafts on the two sides of the prism casing 1, and then the inner bearings 101 on the two sides of the prism casing 1 are directly inserted into the bearing grooves 204 on the rotation frame 2.

Through the structure and the assembly method, complexity of an assembling operation is greatly simplified, an extra tool is not required, production efficiency and a yield are greatly improved, and costs are reduced.

Figure 4:
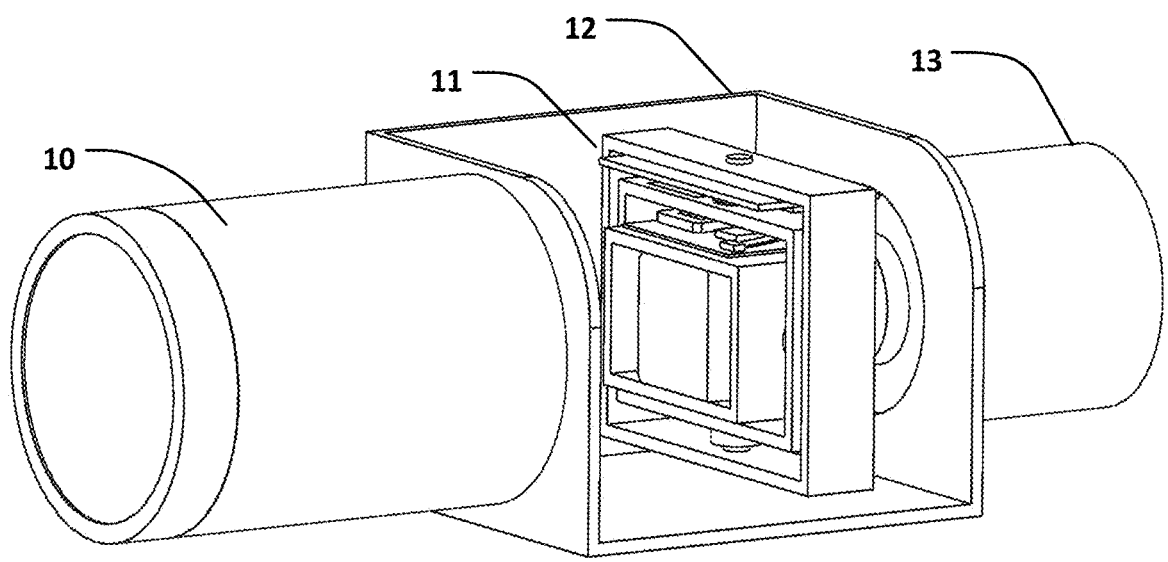
FIG. 4 is a schematic diagram of a structure of a stabilized monocular according to an embodiment of the present disclosure.

In another example embodiment, a stabilized monocular is provided. As shown in FIG. 4, the stabilized monocular includes an ocular lens 13, an objective lens 10, and the stabilized gimbal 11 of an erecting prism, where the stabilized gimbal 11 of an erecting prism is disposed inside an outer casing 12.

Figure 5:
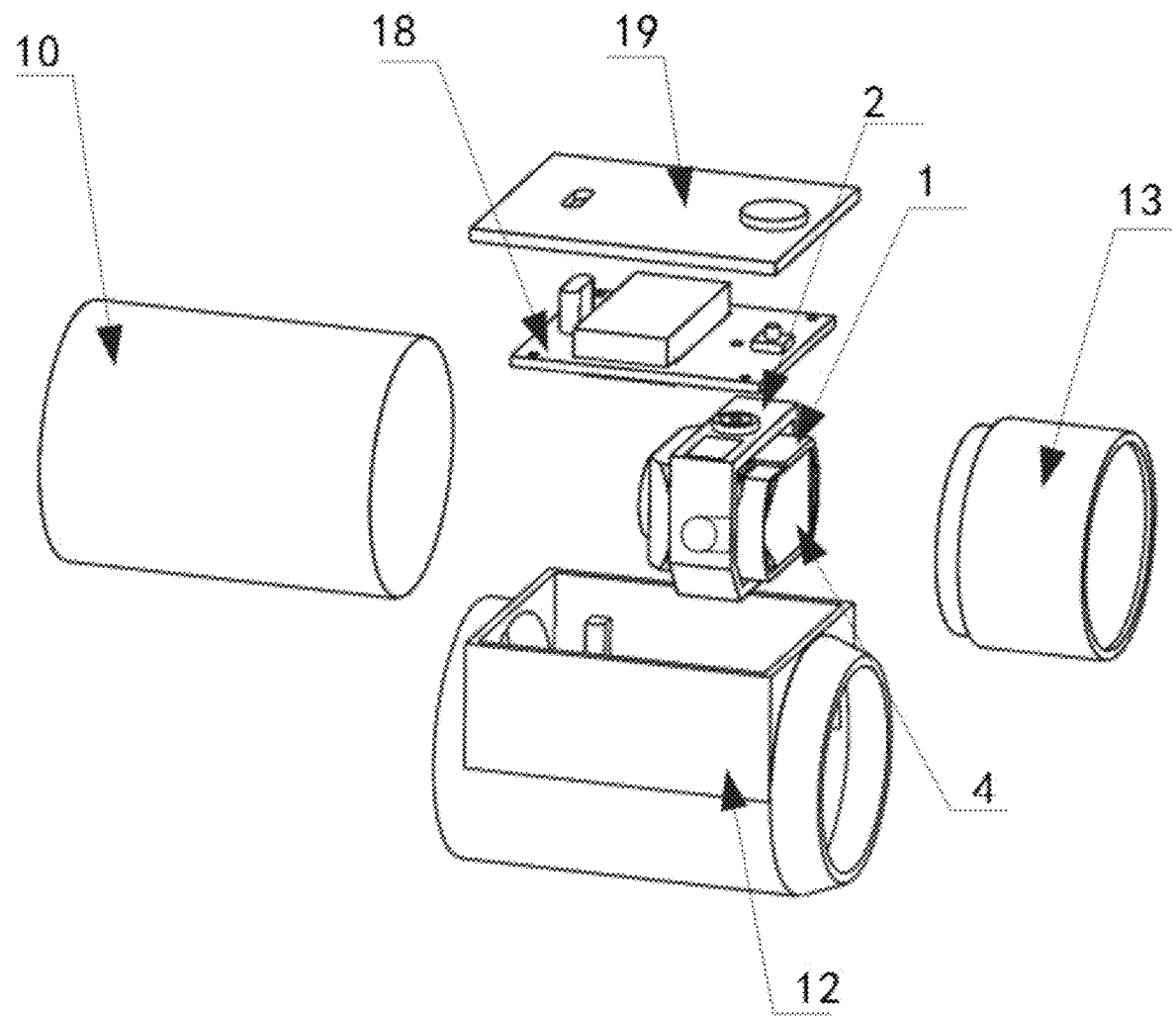
FIG. 5 is another schematic diagram of a structure of a stabilized monocular according to an embodiment of the present disclosure.

For example, as shown in FIG. 5, in this embodiment, an independent external mounting bracket 3 is removed; a bearing groove for mounting a bearing is designed on the bottom of the outer casing 12; a control circuit board 18 is fastened to the upper part of the outer casing 12, and a rotation shaft is disposed on a position that is of the control circuit board 18 and that corresponds to the bearing; a rotation frame 2 is mounted between the bearing mounted on the bottom of the outer casing 12 and the rotation shaft on the control circuit board 18; and an upper cover 19 is disposed on the upper part of the control circuit board 18. This creative design can improve integrity, reduce a size, and reduce assembling difficulty and production costs.

In this embodiment, the control circuit board includes a charging port, an onboard lithium battery, a control chip, a drive chip, and a button. In addition, a battery compartment can be additionally arranged for changing a built-in lithium battery into a replaceable battery.

Figure 6:
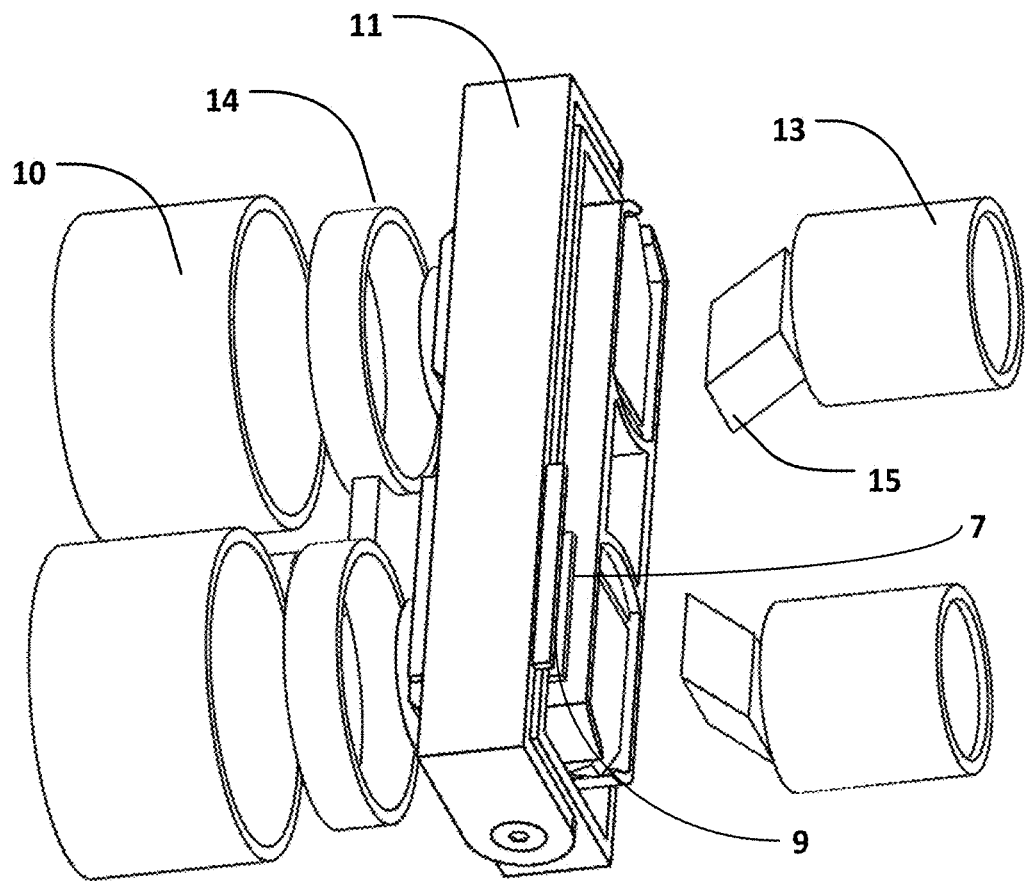
FIG. 6 is a three-dimensional diagram of stabilized binoculars according to an embodiment of the present disclosure.
Figure 7:
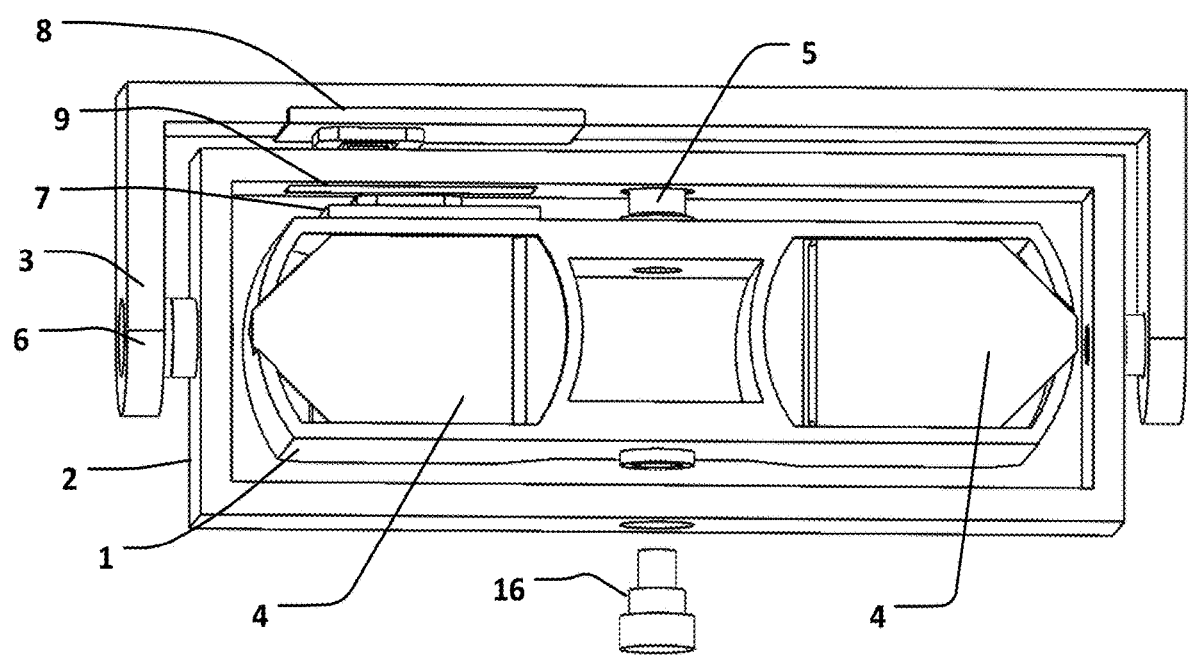
FIG. 7 is a front view of stabilized binoculars according to an embodiment of the present disclosure.

In another example embodiment, stabilized binoculars are provided. As shown in FIG. 6 and FIG. 7, the stabilized binoculars include two ocular lenses 13, two objective lenses 10, and the stabilized gimbal 11 of an erecting prism; the two ocular lenses 13 are a first ocular lens and a second ocular lens, and the two objective lenses 10 are a first objective lens and a second objective lens; two ejecting prisms 4 which are a first erecting prism and a second erecting prism are disposed in a prism casing 1 of the stabilized gimbal 11 of an erecting prism; the first ocular lens, the first erecting prism 4, and the first objective lens are correspondingly disposed; and the second ocular lens, the second erecting prism, and the second objective lens are correspondingly disposed. A rhombic prism 15 is disposed on each of the first ocular lens and the second ocular lens, and a focusing lens 14 is disposed between the objective lens 10 and the ejecting prism 4. A difference between this embodiment and the original patent and product lies in that a set of drive magnetic steel 8 is embedded into the rotation frame 2, and is configured to, together with the first circuit board 7 on the prism casing 1 and two coils on the second circuit board 9 on an external mounting bracket 3, drive the two shafts to rotate respectively.

The prism casing 1 of the binocular telescope is large in size and weight, and therefore needs to be high in connection strength and reliability. A screw bearing 16 is configured to assemble the prism casing 1 and the rotation frame 2, to achieve advantages of high precision, a reliable connection, a few parts, and a convenient assembling operation.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Several examples are used herein for illustration of the principles and implementations of the present disclosure. The description of the foregoing examples is used to help illustrate the method of the present disclosure and the core principles thereof. In addition, those of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A stabilized gimbal of an erecting prism, comprising:
a prism casing, a rotation frame, an external mounting bracket, and a drive control assembly, wherein
the erecting prism is mounted in the prism casing;
the prism casing is rotatably mounted in the rotation frame; and a rotation shaft, relative to the rotation frame, of the prism casing is a first rotation shaft;
the rotation frame is rotatably mounted in the external mounting bracket; and a rotation shaft, relative to the external mounting bracket, of the rotation frame is a second rotation shaft;
the first rotation shaft and the second rotation shaft are perpendicular to each other; and
the drive control assembly is separately connected to the prism casing and the rotation frame, and the drive control assembly is configured to: drive the prism casing to rotate around the first rotation shaft, and drive the rotation frame to rotate around the second rotation shaft based on deflection position information of the prism casing, deflection position information of the rotation frame, and three-dimensional rotation angular velocity information of the erecting prism;
wherein the drive control assembly comprises a first circuit board that is disposed on a first preset position outside the prism casing, drive magnetic steel that is disposed on a second preset position of the rotation frame, and a second circuit board that is disposed on a third preset position inside the external mounting bracket;
a first drive coil, a first Hall element, and a gyroscope sensor are disposed on the first circuit board;
a second drive coil, a second Hall element, a coil drive chip, and a microprocessor chip are disposed on the second circuit board;
the first Hall element and the gyroscope sensor are connected to the microprocessor chip through a flexible connection line; and the coil drive chip is connected to the first drive coil through a flexible connection line;
the second Hall element is connected to the microprocessor chip, the microprocessor chip is connected to the coil drive chip, and the coil drive chip is connected to the second drive coil;
the first preset position corresponds to the second preset position to enable, through interaction of the first drive coil and the drive magnetic steel, the prism casing to rotate around the first rotation shaft in the rotation frame;
the second preset position corresponds to the third preset position to enable, through interaction of the drive magnetic steel and the second drive coil, the rotation frame to rotate around the second rotation shaft in the external mounting bracket;

the first Hall element is configured to acquire deflection position information of the first rotation shaft, the second Hall element is configured to acquire deflection position information of the second rotation shaft, and the gyroscope sensor is configured to acquire the three-dimensional rotation angular velocity information of the erecting prism; and the microprocessor chip is configured to: generate a drive control quantity based on the deflection position information of the first rotation shaft, the deflection position information of the second rotation shaft, and the three-dimensional rotation angular velocity information of the erecting prism, and output the drive control quantity to the coil drive chip for driving the prism casing and the rotation frame to rotate via the first drive coil and the second drive coil.

2. The stabilized gimbal of an erecting prism according to claim 1, wherein the microprocessor chip is configured to perform the following operations to generate the drive control quantity based on the deflection position information of the first rotation shaft, the deflection position information of the second rotation shaft, and the three-dimensional rotation angular velocity information of the erecting prism, and output the drive control quantity to the coil drive chip for driving the prism casing and the rotation frame to rotate via the first drive coil and the second drive coil:

calculating a target angular velocity value of the first rotation shaft based on the deflection position information of the first rotation shaft;

calculating a target angular velocity value of the second rotation shaft based on the deflection position information of the second rotation shaft;

obtaining, based on the three-dimensional rotation angular velocity information of the erecting prism, an angular velocity feedback quantity of the erecting prism along the first rotation shaft, and an angular velocity feedback quantity of the erecting prism along the second rotation shaft as a first angular velocity feedback quantity and a second angular velocity feedback quantity respectively;

obtaining, based on the first angular velocity feedback quantity, the drive control quantity by running a feedback control algorithm, and controlling the prism casing to rotate by controlling the first drive coil to energize for the first angular velocity feedback quantity to be consistent with the target angular velocity value of the first rotation shaft; and obtaining, based on the second angular velocity feedback quantity, the drive control quantity by running the feedback control algorithm, and controlling the rotation frame to rotate by controlling the second drive coil to energize for the second angular velocity feedback quantity to be consistent with the target angular velocity value of the second rotation shaft.

3. The stabilized gimbal of an erecting prism according to claim 2, wherein a calculation formula of the target angular velocity value of each of the first rotation shaft and the second rotation shaft is as follows:

Hall_$V$=DIFF(Hall_$M$);

GyroV_$Ext$=Hall_$V$*P_$Ext$;

GyroV_$Aim$=GyroV_$Ext$+GyroV_$Mid$, wherein

Hall_M is the deflection position information, Hall_V is an offset angular velocity, DIFF( ) is a differential algorithm function, GyroV_Ext is an extra deflection angular velocity, P_Ext is an extra deflection coefficient, GyroV_Aim is the target angular velocity value, and GyroV_Mid is a centering angular acceleration.

4. The stabilized gimbal of an erecting prism according to claim 1, wherein the prism casing is connected to the rotation frame via a bearing, and the rotation frame is connected to the external mounting bracket via a bearing.

5. The stabilized gimbal of an erecting prism according to claim 4, wherein the rotation frame is provided with two bearing grooves on two side walls corresponding to two ends of the first rotation shaft, an opening of the bearing groove is provided on at least one edge of the side wall; and during mounting, a bearing mounted on a rotation shaft of the prism casing is inserted into the bearing groove from the edge; and a lug boss is disposed in the bearing groove, the lug boss is configured to clamp the bearing, and a stiffener is disposed at the opening of the bearing groove.

6. The stabilized gimbal of an erecting prism according to claim 4, wherein the rotation frame is connected to the external mounting bracket via an external threaded screw bearing.

7. The stabilized gimbal of an erecting prism according to claim 1, wherein the rotation frame is provided with two bearing grooves on two side walls corresponding to two ends of the first rotation shaft, an opening of the bearing groove is provided on at least one edge of the side wall; and during mounting, a bearing mounted on a rotation shaft of the prism casing is inserted into the bearing groove from the edge; and a lug boss is disposed in the bearing groove, the lug boss is configured to clamp the bearing, and a stiffener is disposed at the opening of the bearing groove.

8. The stabilized gimbal of an erecting prism according to claim 1, wherein the rotation frame is connected to the external mounting bracket via an external threaded screw bearing.

9. A stabilized monocular, wherein the stabilized monocular comprises an ocular lens, an objective lens, and the stabilized gimbal of an erecting prism according to claim 1, wherein the stabilized gimbal of an erecting prism is disposed in a casing between the ocular lens and the objective lens.

10. The stabilized monocular according to claim 9, wherein the casing is used as an external mounting bracket of the stabilized gimbal of an erecting prism.

11. The stabilized monocular according to claim 9, wherein the microprocessor chip is configured to perform the following operations to generate the drive control quantity based on the deflection position information of the first rotation shaft, the deflection position information of the second rotation shaft, and the three-dimensional rotation angular velocity information of the erecting prism, and output the drive control quantity to the coil drive chip for driving the prism casing and the rotation frame to rotate via the first drive coil and the second drive coil:

calculating a target angular velocity value of the first rotation shaft based on the deflection position information of the first rotation shaft;

calculating a target angular velocity value of the second rotation shaft based on the deflection position information of the second rotation shaft;

obtaining, based on the three-dimensional rotation angular velocity information of the erecting prism, an angular velocity feedback quantity of the erecting prism along the first rotation shaft, and an angular velocity feedback quantity of the erecting prism along the second rotation shaft as a first angular velocity feedback quantity and a second angular velocity feedback quantity respectively;

obtaining, based on the first angular velocity feedback quantity, the drive control quantity by running a feedback control algorithm, and controlling the prism casing to rotate by controlling the first drive coil to energize for the first angular velocity feedback quantity to be consistent with the target angular velocity value of the first rotation shaft; and obtaining, based on the second angular velocity feedback quantity, the drive control quantity by running the feedback control algorithm, and controlling the rotation frame to rotate by controlling the second drive coil to energize for the second angular velocity feedback quantity to be consistent with the target angular velocity value of the second rotation shaft.

12. The stabilized monocular according to claim 11, wherein a calculation formula of the target angular velocity value of each of the first rotation shaft and the second rotation shaft is as follows:

$$Hall\_V = DIFF(Hall\_M);$$

$$GyroV\_Ext = Hall\_V * P\_Ext;$$

$$GyroV\_Aim = GyroV\_Ext + GyroV\_Mid, \text{ wherein}$$

Hall_M is the deflection position information, Hall_V is an offset angular velocity, DIFF( ) is a differential algorithm function, GyroV_Ext is an extra deflection angular velocity, P_Ext is an extra deflection coefficient, GyroV_Aim is the target angular velocity value, and GyroV_Mid is a centering angular acceleration.

13. The stabilized monocular according to claim 9, wherein the prism casing is connected to the rotation frame via a bearing, and the rotation frame is connected to the external mounting bracket via a bearing.

14. The stabilized monocular according to claim 9, wherein the rotation frame is provided with two bearing grooves on two side walls corresponding to two ends of the first rotation shaft, an opening of the bearing groove is provided on at least one edge of the side wall; and during mounting, a bearing mounted on a rotation shaft of the prism casing is inserted into the bearing groove from the edge; and a lug boss is disposed in the bearing groove, the lug boss is configured to clamp the bearing, and a stiffener is disposed at the opening of the bearing groove.

15. The stabilized monocular according to claim 9, wherein the rotation frame is connected to the external mounting bracket via an external threaded screw bearing.

16. Stabilized binoculars, wherein the stabilized binoculars comprise a first ocular lens, a second ocular lens, a first objective lens, a second objective lens, and the stabilized gimbal of an erecting prism according to claim 1, wherein a first erecting prism and a second erecting prism are disposed in a prism casing of the stabilized gimbal of an erecting prism;

the first ocular lens, the first erecting prism, and the first objective lens are correspondingly disposed; and the second ocular lens, the second erecting prism, and the second objective lens are correspondingly disposed.

17. The stabilized binoculars according to claim 10, wherein the microprocessor chip is configured to perform the following operations to generate the drive control quantity based on the deflection position information of the first rotation shaft, the deflection position information of the second rotation shaft, and the three-dimensional rotation angular velocity information of the erecting prism, and output the drive control quantity to the coil drive chip for driving the prism casing and the rotation frame to rotate via the first drive coil and the second drive coil:

calculating a target angular velocity value of the first rotation shaft based on the deflection position information of the first rotation shaft;

calculating a target angular velocity value of the second rotation shaft based on the deflection position information of the second rotation shaft;

obtaining, based on the three-dimensional rotation angular velocity information of the erecting prism, an angular velocity feedback quantity of the erecting prism along the first rotation shaft, and an angular velocity feedback quantity of the erecting prism along the second rotation shaft as a first angular velocity feedback quantity and a second angular velocity feedback quantity respectively;

obtaining, based on the first angular velocity feedback quantity, the drive control quantity by running a feedback control algorithm, and controlling the prism casing to rotate by controlling the first drive coil to energize for the first angular velocity feedback quantity to be consistent with the target angular velocity value of the first rotation shaft; and obtaining, based on the second angular velocity feedback quantity, the drive control quantity by running the feedback control algorithm, and controlling the rotation frame to rotate by controlling the second drive coil to energize for the second angular velocity feedback quantity to be consistent with the target angular velocity value of the second rotation shaft.

* * * * *